Patented Nov. 20, 1951

2,575,463

UNITED STATES PATENT OFFICE 2,575,463

PROCESS FOR PREPARING LEUCO SULFURIC ACID ESTERS OF VAT DYESTUFFS AND SALTS THEREOF

James Ogilvie, Buffalo, N. Y., and Guido Genta, Hillside, N. J., assignors to Allied Chemical & Dye Corporation, New York, N. Y., a corporation of New York No Drawing. Application May 11, 1949, Serial No. 92,736

16 Claims. (Cl. 260—329.2)

1

This invention relates to a process for preparing leuco sulfuric acid esters of vat dyestuffs and salts thereof.

The leuco sulfuric acid ester salts are stable forms of leuco compounds of the vat dyestuffs from which they are derived. They are not re-oxidized to the parent vat dyestuff upon exposure to air; they are relatively more soluble in water than the parent compounds, and form neutral aqueous solutions. They are generally substantive toward animal fibers (e. g. wool, silk, nylon, casein wool), and vegetable fibers. When subjected to a mild oxidizing agent (such as a nitrite, chromate, etc.) in a dilute acid medium, they are converted by hydrolysis and oxidation into the corresponding parent insoluble vat dyestuff. Accordingly, these ester salts can be applied for coloring textile materials by much less complicated processes and controls than are required for dyeing and printing with the ordinary vat dyestuffs. As a result, leuco sulfuric acid ester salts of vat dyestuffs are in great demand.

Leuco sulfuric esters of many vat dyestuffs have been prepared in the past by a number of methods. One method previously used involves preliminary preparation of the leuco form of the vat dyestuff and reaction of this form with sulfur trioxide in the presence of a tertiary organic base. This process is unsatisfactory because it is difficult to prevent reoxidation of the leuco compound when preparing it in the anhydrous condition necessary for the esterification reaction.

Another prior art process involves mechanically comminuting the vat dyestuff to finely divided form in a grinding mill, micropulverizer or the like, and suspending the dry, ground dyestuff together with a reducing metal in a liquid tertiary organic nitrogen base and treating the resulting mixture with an esterifying agent. This process is troublesome in the necessity for finely grinding the dyestuff, wasteful because of physical loss of product, and in many instances it functions indifferently or not at all and is particularly unsatisfactory for use with many anthraquinone vat dyestuffs which, even when in comminuted, finely divided form, still offer great resistance to reduction.

We have now found that disadvantages of the prior art may be avoided, and vat dyestuffs, including the indigoid, thio-indigoid, anthraquinone and other series, may readily be reduced and esterified to their leuco sulfuric acid esters according to our novel process, wherein the dry vat dyestuff is dissolved in an anhydrous sulfuric acid substance, and the solution thus formed is introduced into an excess of a liquid organic tertiary nitrogen base whereby the dyestuff is precipitated in finely divided, readily reactive form which, while thus suspended in the precipitating medium, is thereafter reduced and esterified to its leuco sulfuric acid ester.

In carrying out the process of our invention, the dry vat dyestuff, which need not be finely ground, is dissolved in an anhydrous sulfuric acid substance at a relatively low temperature. At this stage certain dyestuffs, including the blue-green dyestuff identified as Schultz No. 1279 (7th edition) may advantageously be "conditioned" by holding or warming the dyestuff in the sulfuric acid solution for a time sufficient to influence and control the shade of the treated dyestuff before it is added to and reduced and esterified in the tertiary base medium. In most cases, however, the resulting solution in the anhydrous sulfuric acid medium is next introduced into a quantity of a liquid tertiary nitrogen base, such as pyridine, in substantial excess of that necessary to form the complex nitrogen base salt of the acid. This introduction is carried out with precautions to avoid overheating since the mixing effects a strongly exothermic reaction. We avoid the reverse operation, namely, introduction of tertiary base into the acid solution of the vat dyestuff, since in such procedure the tertiary base tends to react to produce such high concentrations of solid salts or addition compounds as to form a thick non-stirrable mass. Upon the introduction of the dyestuff solution into the liquid tertiary base, the vat dyestuff is precipitated in a finely divided form, which is surprisingly reactive and readily susceptible to subsequent reduction and esterification, and this precipitation takes place directly in the medium in which the reduction and esterification reactions are to be carried out. The preparation of the leuco ester of the vat dyestuff may thereafter be effected in standard manner. Preferably, the reducing agent, that is, a reducing metal such as iron, zinc, copper, etc., in finely divided form, is added to the reaction mixture prepared as described above; alternatively, the addition of the metal may precede the addition of the vat dyestuff solution to the base. During and after introduction of the reducing agent, precautions are preferably taken to avoid the access of oxygen to the reaction mass to prevent reoxidation of the leuco compound. This may conveniently be accomplished by blanketing the reaction mass with carbon dioxide or other inert gas.

If the sulfuric acid substance used to dissolve the vat dyestuff is itself an esterifying agent, i. e. a sulfating acid such as chlorosulfonic acid, the resulting mixture of vat dyestuff, sulfating agent, reducing agent and base may be agitated and gently heated to a temperature of not exceeding about 75° C. to promote the esterification reaction without further additions of sulfating agent to the mixture. If, however, the vat dyestuff has been originally dissolved in a sulfuric acid substance which is not an esterifying agent such as sulfuric acid, the esterifying agent is added at this point, for example, chlorosulfonic acid, sulfuric acid anhydride, an alkali metal chlorosulfonate, an alkali metal pyrosulfate, an alkyl ester of chlorosulfonic acid or the like, and the esterification reaction is then carried out by agitation and heating as described. When the esterifying agent is added after the mixture comprises the sulfuric solution of the vat dyestuff, additional tertiary base such as pyridine or its equivalent may be added if required, to provide a stirrable fluid reaction mixture.

After formation of the leuco sulfuric acid ester is complete, the leuco ester may be recovered by known means. For example, the mass may be drowned in cold dilute aqueous alkali metal compound such as sodium carbonate or sodium hydroxide, sufficient to obtain an alkaline mixture. In this manner the tertiary base, formerly bound with acid, is released; and leuco sulfuric ester is converted into a dissolved, water-soluble sodium or other alkali metal salt. The mass may then be steam distilled to remove free tertiary base. The remaining aqueous residue may be clarified by filtration or equivalent means to remove insoluble impurities. The filtrate may be treated, as by salting, to precipitate the sodium salt of the leuco sulfuric acid ester and to permit separation and recovery of the said salt.

In another method of separation which is illustrated in the examples hereinafter described, the reaction mass is cooled and poured into a dilute aqueous solution of a non-oxidizing acid such as acetic or sulfuric acid, sufficient to render the resulting aqueous mass distinctly acid. In this manner, the leuco sulfuric acid ester is precipitated as a complex compound, containing chemically bound tertiary base, while the remaining base forms water-soluble salts which dissolve in the aqueous medium. After the insoluble ester complex is separated from this aqueous mixture, it is digested with aqueous alkali to free the tertiary base and to form the water-soluble alkali metal salt of the released leuco sulfuric acid ester. The aqueous alkaline mass is steam distilled to remove the tertiary base. The resulting aqueous residue is filtered to remove insoluble matter, and the filtrate, which holds the ester salt in solution, may be salted, or evaporated, or otherwise treated to recover the said ester salt.

The leuco sulfuric acid ester in the form of its water-soluble alkali metal salt is stable, and may be used directly for dyeing cotton, wool and other textile materials.

The process of our invention is applicable to vat dyestuffs in general and is particularly adapted for the preparation of leuco sulfuric acid esters of the so-called anthraquinone vat dyestuffs including those of the carbazole type, and particularly those of the anthrone series.

Among the dyestuffs which may be used in the process of our invention are indigoid dyestuffs, including halogenated and thioindigoid dyestuffs; anthraquinone vat dyestuffs including dibenzanthrone, indanthrone, flavanthrone and anthraquinone acridone dyestuffs and the like; the carbazolized anthrimides such as the carbazolized 1,1'-, the 1,2'-, the 1,1',4',1''- and the 1,1',5',1''-thianthrimides, etc.; the vast dyestuffs of the dibenzpyrene-quinone series and sulfur-containing dyestuffs of the anthraquinone series.

The sulfuric acid substance may be any such acid which readily dissolves the particular vat dyestuff; such acids as sulfuric acid, oleum, chlorosulfonic acid, liquid lower alkyl esters of chlorosulfonic acid, etc., and mixtures of such acids may be used. The acid may or may not be an esterifying agent as well. We prefer to use a sulfuric acid substance which functions both as a solvent and subsequently as the esterifying agent. For this purpose chlorosulfonic acid is particularly suitable either alone or in admixture with other acids, for this acid not only offers the advantage of being readily available, but it serves simultaneously as both solvent and esterifying agent and has little adverse effect on many vat dyestuffs at ordinary temperatures.

We have found that the amount of chlorosulfonic acid, or equivalent, employed to dissolve the vat dyestuff, is not critical and we prefer to use from about 4 to about 10 parts by weight per part of vat dyestuff. A proportion of chlorosulfonic acid or equivalent, materially greater than that required to dissolve the vat dyestuff completely, requires the employment of a correspondingly larger amount of tertiary base, and results in unnecessary large batch volumes, and required quantities of reagents, etc. later. On the other hand, the employment of chlorosulfonic acid or equivalent, in amounts materially below those required to dissolve the vat dyestuff completely is less preferred since when the mass is introduced into the tertiary base the vat dyestuff particles which are undissolved in the acid will remain coarse and will react too slowly, if at all, and thus contribute to poor yield and/or inferior quality of the leuco sulfuric ester salt.

As the reducing agent, any of the commonly known reducing metals such as those used hitherto to effect reduction of a vat dyestuff in the presence of tertiary base and a sulfuric acid substance to achieve the esterification reaction may be used in our process. As reducing metal, we prefer to use one or a mixture of finely divided powdered reducing metals, for example, iron, zinc, copper, etc. As brought out above, the reducing metal may be added either to the tertiary base before introduction of the vat dyestuff-acid solution or it may be added after the introduction of the dyestuff solution. However, we avoid addition of reducing metal to the acid solution of the dyestuff before addition of the said solution to the pyridine, as such addition is likely to effect the uncontrolled reduction of the vat dyestuff to forms which do not yield leuco ester salts.

One or a mixture of liquid tertiary nitrogen bases such as those used hitherto as inert suspension media for the reducing and sulfating reactions in the preparation of leuco sulfuric acid esters from vat dyestuffs may be used. Examples of such media are pyridine, the picolines, the lutidines, lepidine, quinoline, isoquinoline, quinaldine and dimethylaniline. Of these, pyridine is preferred because of its ready availability and volatility.

The quantity of tertiary nitrogen base in which the acid-dyestuff solution is drowned, is not critical as long as this quantity is sufficiently in excess of that theoretically required to form the salts of the acids, to provide a dispersion medium. The precipitated dyestuff and solid nitrogen base complex constitute the disperse phase of the resulting disperse system, and with the excess of nitrogen base dispersion medium provide a readily stirrable mixture, in which the subsequent reduction and esterification reactions are readily carried out. Suitable weight ratios of dyestuff to tertiary base may range from between about 1:5 to about 1:20 or higher.

In general, we prefer to prepare and maintain the acid solution of the vat dyestuff at a relatively low temperature which depends upon the readiness with which the dissolving acid tends to react to sulfonate, deacylate or dealkylate the vat dyestuff. Such temperatures which preclude harmful chemical attack generally lie between about minus 10° C. and about 35° C.

The particular blue-green dyestuff (Colour Index 1173 and Schultz, 7th Ed. #1279), which according to Schultz 1st Supplement to 7th Ed., page 46, has the formula

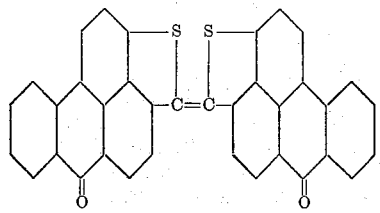

is more soluble in a strong sulfating agent, such as chlorosulfonic acid, than in sulfuric acid, but it is also sulfonated relatively easily by such strong sulfating agents, even at low temperatures. When such sulfonation occurs in the process of forming the leuco sulfuric acid ester of this dyestuff, the sulfonation products remain more or less as water-soluble salts, intimately mixed with the desired, recovered leuco sulfuric acid ester salt. Thus the sulfonated product lowers the yield of the ester salt and, if present in an appreciable amount, may markedly degrade the dyeing qualities of the ester salt. For example, it may cause a dyeing made with the ester salt to have lowered fastness to washing.

Sulfuric acid admixed with the strong sulfating agent suppresses undesirable sulfonation of this vat dyestuff. Additionally, as is known, this dyestuff may be modified to produce yellower shades of blue-green by warming a sulfuric acid solution of the dyestuff, or by increasing the period during which such a solution is held at a substantially uniform relatively low temperature. This effect of solution in sulfuric acid upon the vat dyestuff can be achieved in like manner in the mixture of sulfuric acid and sulfating acid described above. The modified shade is substantially retained in the ester salt prepared from the acid solution immediately after the modifying treatment.

Accordingly, in preparing the leuco sulfuric acid ester of this blue-green dyestuff, we use, as the acid solvent, a mixture of a sulfating acid such as chlorosulfonic acid and sulfuric acid. Such a mixture of acid is used in an amount which is sufficient to dissolve the vat dyestuff, and also to contain sufficient sulfating acid to esterify the leuco vat dyestuff and form its disulfuric ester. Preferably we use a mixture containing between about 25% and about 50% by weight of sulfuric acid, the remainder being chlorosulfonic acid or equivalent, and preferably in sufficient quantity completely to dissolve the dyestuff at a temperature between about 0° C. and about 10° C. We may then effect the "conditioning" treatment by gently heating while agitating the dyestuff-acid mixture, to a temperature between about 10° C. and about 30° C., and thereafter maintaining the mass at the desired temperature for the necessary length of time, up to about 2 hours, required to attain the particular shade desired. By varying the temperature and the duration time of "conditioning" in the acid solution, the green shade obtainable with the resulting leuco sulfuric acid ester may be regulated at will within a range extending from the bluish-green shade obtainable by dyeing with the parent dyestuff, to a shade considerably yellower than that obtainable from the parent vat dyestuff; lower temperatures and shorter durations producing relatively bluer shades, higher temperatures and longer durations producing relatively yellower shades.

The temperature in the conditioning step should not exceed about 30° C., as at this point appreciable sulfonation of the dyestuff begins to take place. On the other hand, temperatures below about 10° C. for the conditioning step should be avoided as the conditioning proceeds unduly slowly at this temperature, particularly if a yellower shade than that of the unconditioned dyestuff is desired.

The following specific examples will further illustrate our invention.

*Example 1*

20 parts of carbazolized 1,1',4',1''-trianthrimide, i. e., the carbazole of the product of Colour Index No. 1149, were agitated with 80 parts of chlorosulfonic acid at 10° C. for 4 hours until a complete solution was obtained. The solution was stirred into 300 parts of anhydrous pyridine slowly and without permitting the temperature to exceed 40° C., whereupon the vat dyestuff was precipitated in finely divided form. The mass was blanketed with carbon dioxide and 20 parts of iron powder of 300 mesh fineness were added. The mass thus obtained was heated slowly to 45° C. with agitation and maintained at that temperature for 8 hours to complete the reaction. The reaction mixture was poured into an agitated solution of 220 parts of 66° Bé. sulfuric acid in 1250 parts of water, which was kept at 5°–10° C. or lower to prevent the formation of a gummy precipitate of the complex pyridine salt of the leuco sulfuric acid ester. The mass was further agitated at 5°–10° C. for one hour, and filtered. To form the sodium salt of the leuco sulfuric acid ester, the filter cake was digested with a solution of 20 parts of soda ash in 500 parts of water; the aqueous mixture was heated to 65° C. and then distilled under vacuum (about 130 mm. Hg) at 60° C. until all liberated pyridine was removed. The aqueous distillation residue was sludge filtered, and the filter cake was washed with hot water (70° C.). To the combined filtrate and wash were added 25 parts of soda ash, 1 part of sodium isobutyl sulfate, 2.5 parts of water-soluble dextrine and 0.5 part of potassium hydroxide. The resulting mixture was agitated to obtain complete solution, and then drum-dried. The dry product was ground to a powder of 60 mesh.

The yield of leuco sulfuric acid ester thus obtained corresponded to 13 parts of the parent vat dyestuff, or 65% of that theoretically possible. The product yielded beautiful brown prints of excellent fastness properties on cotton.

Example 2

10 parts of the dry vat dyestuff, obtained by carbazolization of 1,1',5',1''-trianthrimide, were agitated with 40 parts of chlorosulfonic acid at 5° C. until a complete solution was obtained. The resulting solution was introduced slowly as a fine stream into 150 parts of anhydrous pyridine with agitation and cooling to prevent heating above 50° C., whereupon the vat dyestuff precipitated in finely divided form. The mass was cooled to 20° C., and blanketed with carbon dioxide. Then 10 parts of iron powder of 300 mesh fineness were added, after which the mixture thus obtained was heated slowly to 50° C., and maintained at that temperature with agitation for 6 hours to complete the reaction. The reaction mass was cooled to room temperature and stirred for 12 hours, after which it was poured into a solution of 50 parts of glacial acetic acid in 500 parts of water at 5°–10° C. The pyridine complex of the leuco sulfuric acid ester precipitated thereby was isolated by filtration. The filter cake was heated with a solution of 5 parts of sodium carbonate in 500 parts of water to 60° C. for 1 hour to form a solution of the sodium salt of the leuco sulfuric acid ester, and the aqueous mass was then distilled under vacuum at 60° C. until the liberated pyridine was removed. The hot aqueous distillation residue was filtered; diluting solutes were added to adjust the amount of non-dyeing solutes and dissolved sodium salt of the leuco sulfuric acid ester in the filtrate, to desired standard proportions, and the resulting aqueous solution was then dried, all in a manner similar to that described in Example 1. The dry product was ground to powder.

The yield of leuco sulfuric acid ester thus obtained was larger than that obtained by any of the known prior art processes by between 30% and 40% of the possible theoretical yield. The leuco sulfuric acid ester product obtained by the foregoing procedure yielded bright yellow prints of excellent fastness properties on cotton.

Example 3

36 parts of powdered dibromodibenzpyrenequinone were agitated with a mixture of 143 parts of chlorosulfonic and 92 parts of 100% sulfuric acid for 16 hours at 20° C. until completely dissolved. The solution thus obtained was stirred into 650 parts of dry pyridine, during which the temperature rose spontaneously to 50° C., whereupon the vat dyestuff was precipitated in finely divided form. Then 36 parts of iron powder were added, and the resulting mixture was heated to 75° C. for 3 hours with agitation to complete the formation of the leuco sulfuric acid ester. The reaction mass was poured into a mixture of 2100 parts of ice water and 255 parts of 66° Bé. sulfuric acid, and the precipitated pyridine complex of the leuco ester was separated by filtration and washed with a small amount of ice water. The filter cake was heated with a solution of 40 parts of sodium carbonate in 2800 parts of water to 50°–60° C. for about 1 hour to form the sodium salt of the leuco sulfuric acid ester, and the liberated pyridine was removed by distillation under vacuum at 60° C. The distillation residue was diluted with hot water to a volume equivalent to 4000 parts of water, and filtered at 75° C., and the filter cake was washed with hot water (75° C.) until a substantially colorless filtrate was obtained. The sodium salt of the leuco sulfuric acid ester was precipitated by salting the filtrate with 12% by volume of common salt, and cooling to room temperature. The precipitated leuco ester was separated as a cake by filtration, and mixed with 4 parts of $Na_2CO_3$, 2 parts of flaked potassium hydroxide, 6 parts of dextrine, 6 parts of glucose, 6 parts of caffeine, 1 part of sodium isobutyl sulfate, and sufficient water to form an easily stirrable solution which was drum-dried under vacuum.

The amount of leuco sulfuric acid ester thus obtained was equivalent to 30 parts of the parent vat dyestuff, or 83% of the theoretical yield. When printed on cotton fabric in a manner conventionally employed for printing with leuco sulfuric acid esters of vat dyes, the product yielded bright yellow prints of excellent fastness properties.

When the reaction was effected according to prior art procedure by adding the powdered vat dyestuff and iron to a mixture of pyridine and chlorosulfonic acid, substantially lower yields (about 60% of theory) of leuco sulfuric acid ester were obtained.

Example 4

36 parts of the blue green sulfur-containing vat dyestuff, identified at Schultz 7th Ed. No. 1279 and by formula in 1st Supplement to Schultz 7th Ed. at p. 46 (vide supra), were added during 4 hours to a mixture of 145 parts of chlolosulfonic acid and 92 parts of 100% sulfuric acid at 5°–10° C. and the mass thus obtained was agitated for another hour at 5°–10° C. to effect complete solution of the dyestuff. The solution was slowly heated to 25° C. during 30 minutes, and then poured during about 30 minutes in to 660 parts of well-agitated, anhydrous pyridine precooled to 5°–10° C. By such gradual addition, the vat dyestuff was precipitated in finely divided form, in the forming mixture wherein the temperature was allowed to rise to 65°–70° C. The resulting mixture was then cooled to 25° C., and blanketed with an atmosphere of carbon dioxide. 36 parts of iron powder (300 mesh fineness) were added, and the mass was heated to 75° C. during 2 hours with agitation and maintained at 75° C. for 4 hours in a carbon dioxide atmosphere to complete the reaction. The reaction mixture was cooled to 30°–35° C., and poured into a mixture of 2100 parts of ice water and 258 parts of 100% sulfuric acid, whereupon the pyridine complex of the leuco sulfuric acid ester precipitated as redbrown crystals. The mass was filtered; the filter cake was stirred into a solution of 40 parts of sodium carbonate in 2800 parts of water, the mixture was heated to 60° C. for about an hour to assure formation of the sodium salt of the leuco sulfuric acid ester, and the pyridine thus freed was removed by distilling the mixture under vacuum at 60° C. 18 parts of trisodium phosphate and 30 parts of caffeine were added to the distillation residue, which was adjusted to a temperature of 75° C. and filtered. The wine red filtrate was diluted to a volume equivalent to 5000 parts of water, and the diluted mass was treated at 75° C. with 500 parts of common salt and 100 parts of sodium carbonate to "saltout" the sodium salt of the leuco sulfuric acid ester as a brown crystalline precipitate. The mass was heated to 100° C. to distill last traces of pyridine, cooled to 30° C. and filtered. The filter cake was mixed with 1500 parts of water, 30 parts of caffeine, 20 parts of dextrine, 5 parts of glucose, and 5 parts of sodium hydroxide, and the resulting mixture was drum-dried and ground to a powder.

The yield of leuco sulfuric acid ester thus obtained was equivalent to 32 parts of the parent vat dyestuff, or approximately 90% of the theoretical yield. This is in sharp contrast with a yield of only 50% of theory obtainable by prior art methods. Moreover, the leuco sulfuric ester product obtained according to the example was considerably more soluble in water and in printing pastes, having solubility characteristics satisfactory for commercial use in dyeing namely, a solubility to the extent of about 0.6 ounce per gallon of water, and in printing pastes of at least about 4 ounces of dyestuff in the form of leuco ester, per gallon of printing paste. It yielded prints with a shade which was substantially equal to that of dyeings at equal color strength obtainable by dyeing with the conditioned parent vat dyestuff. Furthermore, the prints were more uniform than the leuco sulfuric acid ester product obtained from the same vat dyestuff separately conditioned, and then subjected to the prior art procedure.

While the above describes the preferred embodiments of our invention it will be understood that departures may be made therefrom within the scope of the specification and claims.

We claim:

1. In a process for the preparation of leuco sulfuric acid esters of vat dyestuffs, the steps which comprise dissolving the vat dyestuff in a substantially anhydrous sulfuric acid substance selected from the group consisting of sulfuric acid, liquid sulfating acids and mixtures thereof, introducing the solution thus obtained into a quantity of a liquid tertiary nitrogen base in excess of that necessary to form the complex nitrogen base salt of the sulfuric acid substance, whereby the vat dyestuff is precipitated in readily reactive form, and thereafter reducing and esterifying the vat dyestuff to its leuco sulfuric acid ester in the tertiary nitrogen base precipitating medium.

2. In a process for the preparation of leuco sulfuric acid esters of vat dyestuffs, the steps which comprise dissolving the vat dyestuff in a substantially anhydrous sulfuric acid substance selected from the group consisting of sulfuric acid, liquid sulfating acids and mixtures thereof, introducing the solution thus obtained into a quantity of a liquid tertiary nitrogen base sufficiently in excess of that necessary to form the complex nitrogen base salt of the sulfuric acid substance to provide a dispersion medium, whereby the vat dyestuff is precipitated in readily reactive form, and thereafter, while agitating the mixture, reducing and esterifying the vat dyestuff to its leuco sulfuric acid ester in the tertiary nitrogen base precipitating medium.

3. In a process for the preparation of leuco sulfuric acid esters of vat dyestuffs, the steps which comprise dissolving the vat dyestuff in a substantially anhydrous sulfuric acid substance selected from the group consisting of sulfuric acid, liquid sulfating acids and mixtures thereof, introducing the solution thus obtained into a quantity of a liquid tertiary nitrogen base equal in weight to between about 5 and about 20 times the weight of the dyestuff used, whereby the vat dyestuff is precipitated in readily reactive form, and thereafter reducing and esterifying the vat dyestuff to its leuco sulfuric acid ester in the tertiary nitrogen base precipitating medium.

4. In a process for the preparation of leuco sulfuric acid esters of vat dyestuffs, the steps which comprise dissolving the vat dyestuff in a substantially anhydrous sulfuric acid substance selected from the group consisting of sulfuric acid, liquid sulfating acids and mixtures thereof, introducing the solution thus obtained into a liquid tertiary nitrogen base sufficient in quantity to form the complex nitrogen base salt of the sulfuric acid substance, and to provide a dispersion medium and thereafter reducing and esterifying the readily reactive form of the vat dyestuff thus obtained to its leuco sulfuric acid ester in the tertiary nitrogen base precipitating medium.

5. In a process for the preparation of leuco sulfuric acid esters of anthraquinone vat dyestuffs, the steps which comprise dissolving the vat dyestuff in a substantially anhydrous sulfuric acid substance selected from the group consisting of sulfuric acid, liquid sulfating acids and mixtures thereof, introducing the solution thus obtained into a quantity of a liquid tertiary nitrogen base sufficiently in excess of that necessary to form the complex nitrogen base salt of the sulfuric acid substance to provide a dispersion medium, whereby the vat dyestuff is precipitated in readily reactive form, and thereafter reducing and esterifying the vat dyestuff to its leuco sulfuric acid ester in the tertiary nitrogen base precipitating medium.

6. In a process for the preparation of leuco sulfuric acid esters of vat dyestuffs, the steps which comprise dissolving the vat dyestuff in a substantially anhydrous sulfating acid, introducing the solution thus obtained into a quantity of a liquid tertiary nitrogen base sufficiently in excess of that necessary to form the complex nitrogen base salt of the sulfating acid to provide a dispersion medium, whereby the vat dyestuff is precipitated in readily reactive form, and thereafter reducing and esterifying the vat dyestuff to its leuco sulfuric acid ester in the tertiary nitrogen base precipitating medium.

7. In a process for the preparation of leuco sulfuric acid esters of anthraquinone vat dyestuffs, the steps which comprise dissolving the vat dyestuff in chlorosulfonic acid, introducing the solution thus obtained into a quantity of a liquid tertiary nitrogen base sufficiently in excess of that necessary to form the complex nitrogen base salt of the chlorosulfonic acid to provide a dispersion medium, whereby the vat dyestuff is precipitated in readily reactive form, and thereafter reducing and esterifying the vat dyestuff to its leuco sulfuric acid ester in the tertiary nitrogen base precipitating medium.

8. In a process for the preparation of leuco sulfuric acid esters of vat dyestuffs, the steps which comprise dissolving the vat dyestuff in chlorosulfonic acid, introducing the solution slowly and with cooling into a quantity, precooled to between about 0° C. and about 10° C., of pyridine sufficiently in excess of that necessary to form the complex pyridine salt of the chlorosulfonic acid to provide a dispersion medium, whereupon the vat dyestuff is precipitated in readily reactive form, adding thereto a reducing metal in powdered form, agitating and heating the mixture in the absence of oxygen to a temperature not exceeding about 75° C. to promote the esterification reaction, and thereafter recovering the leuco sulfuric acid ester of the vat dyestuff.

9. In a process for the preparation of leuco sulfuric acid esters of vat dyestuffs, the steps which comprise dissolving the vat dyestuff in a quantity equal to between about 4 and about 10 times by weight based on the weight of the dyestuff, of chlorosulfonic acid, introducing the solution thus obtained slowly and with cooling into a quantity, precooled to between about 0° C. and about 10° C., of pyridine sufficiently in excess of that necessary to form the complex pyridine salt of the chlorosulfonic acid to provide a dispersion medium, whereupon the dyestuff is precipitated in readily reactive form, adding thereto a reducing metal in powdered form, agitating and heating the mixture in the absence of oxygen to a temperature not exceeding about 75° C. to promote the esterification reaction, and thereafter recovering the leuco sulfuric acid ester of the vat dyestuff.

10. In a process for the preparation of leuco sulfuric acid esters of vat dyestuffs, the steps which comprise dissolving the vat dyestuff in a quantity equal to between about 4 and about 10 times by weight based on the weight of the dyestuff, of chlorosulfonic acid, introducing the solution thus obtained slowly and with cooling into a quantity, precooled to between about 0° C. and about 10° C., of pyridine equal to between about 5 and about 20 times the weight of the vat dyestuff, whereupon the dyestuff is precipitated in readily reactive form, adding thereto a reducing metal in powdered form, agitating and heating the mixture in the absence of oxygen to a temperature not exceeding about 75° C. to promote the esterification reaction, and thereafter recovering the leuco sulfuric acid ester of the vat dyestuff.

11. In a process for preparing the leuco sulfuric acid ester and water soluble ester salts of the blue-green vat dyestuff identified by Colour Index No. 1173, Schultz 7th Ed. No. 1279, and corresponding to the probable formula

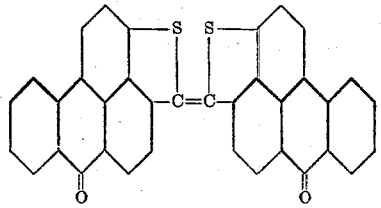

wherein the finely divided dyestuff is converted to its leuco form by the action of a reducing metal in a mixture comprising an anhydrous sulfating acid and an excess of a tertiary base material, the steps which comprise dissolving about 1 part of the dyestuff in not less than about 6 parts of a mixture, maintained at a temperature between about 0° C. and about 10° C., of a sulfating acid and sulfuric acid consisting essentially of between about 25% and about 50% by weight of sulfuric acid and the remainder of sulfating acid, agitating and heating the solution to a temperature between about 10° C. and about 30° C., maintaining the mixture at such temperature for a period between about 15 minutes and about 120 minutes, adding the acid solution to a quantity of an agitated liquid tertiary nitrogen base material in excess of that required to form tertiary base salts of the acids and sufficient to provide a dispersion medium, whereby the dyestuff is precipitated in finely divided, readily reactive form, and thereafter reducing and esterifying the precipitated dyestuff in the precipitating medium.

12. The process of claim 11 wherein the sulfating acid is chlorosulfonic acid.

13. The process of claim 12 wherein the dyestuff-mixed acid solution is held at a temperature between about 10° C. and about 30° C. for a period between about 15 minutes and about 60 minutes.

14. In a process for preparing the leuco sulfuric acid ester and water-soluble ester salts of the vat dyestuff identified by Colour Index No. 1173, Schultz 7th Ed. No. 1279, and corresponding to the probable formula

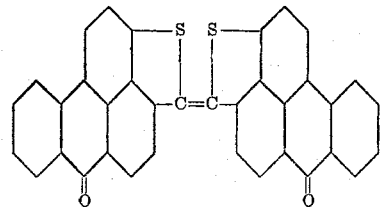

wherein the finely divided dyestuff is converted to its leuco form by the action of a reducing metal in a mixture comprising an anhydrous sulfating acid and an excess of a tertiary base material, the steps for controlling the leuco sulfuric acid ester so as to yield a shade upon dyeing substantially identical with that yielded by the parent dyestuff, which comprise dissolving about 1 part of the dyestuff in between about 6 and about 7 parts of an acid mixture containing about 40% of sulfuric acid and about 60% of chlorosulfonic acid, maintained at a temperature between about 0° C. and about 10° C., agitating and heating the solution for about 1 hour at about 25° C., adding the acid solution to a quantity of pyridine equivalent to at least about 17 parts by weight based on the weight of the dyestuff, whereby the dyestuff is precipitated in finely divided, readily reactive form, and thereafter reducing and esterifying the precipitated dyestuff in the precipitating medium.

15. In a process for the preparation of the leuco sulfuric acid esters of the vat dyestuffs obtained by carbazolization of a trianthrimide, the steps which comprise dissolving the vat dyestuff in a quantity equal to between about 4 and about 10 times by weight based on the weight of the dyestuff, of chlorosulfonic acid, introducing the solution thus obtained slowly and with cooling into a quantity pre-cooled to between about 0° C. and about 10° C. of pyridine sufficiently in excess of that necessary to form the complex pyridine salt of the chlorosulfonic acid to provide a dispersion medium, whereupon the dyestuff is precipitated in readily reactive form, adding powdered iron thereto, agitating and heating the mixture in the absence of oxygen to a temperature not exceeding about 75° C. to promote the esterification reaction, and thereafter recovering the leuco sulfuric acid ester of the vat dyestuff.

16. In a process for the preparation of the leuco sulfuric acid ester of the vat dyestuff dibromodibenzpyrenequinone, the steps which comprise dissolving the vat dyestuff in a quantity equal to between about 4 and about 10 times by weight based on the weight of the dyestuff, of a mixture of sulfuric acid and chlorosulfonic acid, these acids being present in the mixture in a ratio of about one part of sulfuric acid to about 1.5 parts of chlorosulfonic acid, introducing the solution thus obtained slowly and with cooling into a quantity precooled to between about 0° C. and about 10° C. of pyridine sufficiently in excess of that necessary to form the complex pyridine salt of the chlorosulfonic acid to provide a dispersion medium, whereupon the dyestuff is precipitated in readily reactive form, adding powdered iron thereto, agitating and heating the mixture in the absence of oxygen to a temperature not exceeding about 75° C. to promote the esterification reaction, and thereafter recovering the leuco sulfuric acid ester of the vat dyestuff.

JAMES OGILVIE.
GUIDO GENTA.

REFERENCES CITED

The following references are of record in the file of this patent:

UNITED STATES PATENTS

| Number | Name | Date |
|---|---|---|
| 2,117,772 | Stallmann | May 17, 1938 |

FOREIGN PATENTS

| Number | Country | Date |
|---|---|---|
| 271,537 | Great Britain | Nov. 26, 1926 |